(12) United States Patent
Oliveri et al.

(10) Patent No.: US 8,778,171 B2
(45) Date of Patent: *Jul. 15, 2014

(54) HYDROCRACKING CATALYSTS CONTAINING STABILIZED AGGREGATES OF SMALL CRYSTALLITES OF ZEOLITE Y ASSOCIATED HYDROCARBON CONVERSION PROCESSES

(75) Inventors: Christopher G. Oliveri, Stewartsville, NJ (US); Wenyih Frank Lai, Bridgewater, NJ (US); Ajit B. Dandekar, Bridgewater, NJ (US); Scott J. Weigel, Allentown, PA (US); Jason Wu, Clinton, NJ (US); Robert E. Kay, Easton, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 204 days.

This patent is subject to a terminal disclaimer.

(21) Appl. No.: 13/412,945

(22) Filed: Mar. 6, 2012

(65) Prior Publication Data
US 2013/0026070 A1    Jan. 31, 2013

Related U.S. Application Data

(60) Provisional application No. 61/512,042, filed on Jul. 27, 2011, provisional application No. 61/512,067, filed on Jul. 27, 2011.

(51) Int. Cl.
| | |
|---|---|
| B01J 29/08 | (2006.01) |
| B01J 29/06 | (2006.01) |
| B01J 29/10 | (2006.01) |
| B01J 29/12 | (2006.01) |
| C10G 47/10 | (2006.01) |
| C10G 47/12 | (2006.01) |
| C10G 47/14 | (2006.01) |
| C10G 47/18 | (2006.01) |

(52) U.S. Cl.
USPC .............. 208/109; 502/60; 502/64; 502/66; 502/71; 502/79; 208/110; 208/111.01; 208/111.35; 423/700; 423/716

(58) Field of Classification Search
USPC .............. 208/46, 106, 108, 109, 110, 111.01, 208/111.25, 111.35; 502/60, 64, 66, 71, 79; 585/648, 653; 423/700, 716
See application file for complete search history.

(56) References Cited

U.S. PATENT DOCUMENTS

| 3,293,192 A | 12/1966 | Maher et al. |
|---|---|---|
| 3,343,913 A | 9/1967 | Robson |

(Continued)

FOREIGN PATENT DOCUMENTS

| GB | 1058188 | 2/1967 |
|---|---|---|
| GB | 1061847 | 3/1967 |

(Continued)

OTHER PUBLICATIONS

2510740, DW, C2, Sep. 30, 1996, BASF AG.

(Continued)

*Primary Examiner* — Walter D Griffin
*Assistant Examiner* — Derek Mueller
(74) *Attorney, Agent, or Firm* — Bruce M. Bordelon; Chad A. Guice

(57) ABSTRACT

This invention relates to hydrocracking catalysts utilizing stabilized aggregates of small primary crystallites of zeolite Y that are clustered into larger secondary particles. At least 80% of the secondary particles may comprise at least 5 primary crystallites. The size of the primary crystallites may be at most about 0.5 micron, or at most about 0.3 micron, and the size of the secondary particles may be at least about 0.8 micron, or at least about 1.0 μm. The silica to alumina ratio of the resulting stabilized aggregated Y zeolite may be 4:1 or more. This invention also relates to the use of such catalysts in hydrocracking processes for the conversion of heavy oils into lighter fuel products. The invention is particularly suited for the selective production of diesel range products from gas oil range feedstock materials under hydrocracking conditions.

44 Claims, 7 Drawing Sheets

(56) References Cited

U.S. PATENT DOCUMENTS

| | | | |
|---|---|---|---|
| 3,354,078 | A | 11/1967 | Miale et al. |
| 3,402,996 | A | 9/1968 | Maher et al. |
| 3,442,795 | A | 5/1969 | Kerr et al. |
| 3,493,519 | A | 2/1970 | Kerr et al. |
| 3,506,400 | A | 4/1970 | Eberly, Jr. et al. |
| 3,516,786 | A | 6/1970 | Maher et al. |
| 3,591,488 | A | 7/1971 | Eberly, Jr. et al. |
| 3,640,681 | A | 2/1972 | Pickert |
| 3,690,823 | A | 9/1972 | Young |
| 3,691,099 | A | 9/1972 | Young |
| 3,808,326 | A | 4/1974 | McDaniel et al. |
| 3,836,561 | A | 9/1974 | Young |
| 3,864,282 | A | 2/1975 | Young |
| 3,937,791 | A | 2/1976 | Garwood et al. |
| 4,093,560 | A | 6/1978 | Kerr et al. |
| 4,218,307 | A | 8/1980 | McDaniel |
| 4,273,753 | A | 6/1981 | Chang |
| 4,897,178 | A | 1/1990 | Best et al. |
| 5,531,808 | A | 7/1996 | Ojo et al. |
| 5,620,590 | A | 4/1997 | Absil et al. |
| 5,779,992 | A * | 7/1998 | Higashi .......... 422/618 |
| 5,849,258 | A | 12/1998 | Lujano et al. |
| 5,902,564 | A | 5/1999 | Lujano et al. |
| 5,993,773 | A | 11/1999 | Funakoshi et al. |
| 6,261,441 | B1 | 7/2001 | Gentry et al. |
| 6,284,218 | B1 | 9/2001 | Kuvettu et al. |
| 6,306,363 | B1 | 10/2001 | Funakoshi et al. |
| 6,746,659 | B2 | 6/2004 | Pinnavaia et al. |
| 6,843,977 | B2 | 1/2005 | Pinnavaia et al. |
| 6,902,664 | B2 | 6/2005 | Timken |
| 2002/0121457 | A1 | 9/2002 | Tsao et al. |
| 2003/0044350 | A1 | 3/2003 | Lam et al. |
| 2004/0138051 | A1 | 7/2004 | Shan et al. |
| 2005/0239634 | A1 | 10/2005 | Ying et al. |
| 2006/0175231 | A1 | 8/2006 | Hansen et al. |
| 2007/0244347 | A1 | 10/2007 | Ying et al. |
| 2008/0138274 | A1 | 6/2008 | Garcia-Martinez |
| 2008/0214882 | A1 | 9/2008 | Pinnavaia et al. |
| 2009/0029847 | A1 | 1/2009 | Euzen et al. |
| 2009/0090657 | A1 | 4/2009 | Ying et al. |
| 2010/0147747 | A1 | 6/2010 | Elia et al. |

FOREIGN PATENT DOCUMENTS

| | | |
|---|---|---|
| JP | 53101003 | 9/1978 |
| NL | 7604264 | 4/1976 |

OTHER PUBLICATIONS

G.T. Kerr, "Hydrogen Zeolite Y, Ultrastable Zeolite Y, and Aluminum-Deficient Zeolites"—Chapter 19 in W. Meier, et al. Advances in Chemistry, American Chemical Society, Washington, DC, 1973.

Letter to the Editors, "Superactive Crystalline Aluminosilicate Hydrocarbon Catalysts", Journal of Catalysis, 4, 1965, pp. 527-529.

H. Julide Koroglu, et al., "Effects of low-temperature gel aging on the synthesis of zeolite Y at different alkalinities", Journal of Crystal Growth, 241, 2002, pp. 481-488.

C. Berger, et al., "The synthesis of large crystals of zeolite Y revisited", Microporous and Mesoporous Materials, 83, 2005, pp. 333-344.

J. N. Miale, et al., "Catalysis by Crystalline Aluminosilicates IV. Attainable Catalytic Cracking Rate Constants, and Superactivity", Journal of Catalysis, 6, 1966, pp. 278-287.

C. T. Campbell, et al., "The Adsorption, Desorption, and Reactions of CO and O2 on Rh2", Journal of Catalysis, 54, 1978, pp. 289-302.

K. Rajagopalan, et al., "Influence of Zeolite Particle Size on Selectivity During Fluid Catalytic Cracking", Applied Catalysis, 23, 1986, pp. 69-80.

D. H. Olson, et al., "Chemical and Physical Properties of the ZSM-5 Substitutional Series", Journal of Catalysis, 61, 1980, pp. 390-396.

Shigeo Miwa, editor, "Powder Engineering Theory", 1981, Nikkan Kogyo Shinbun KK, pp. 1-31.

\* cited by examiner

US 8,778,171 B2

HYDROCRACKING CATALYSTS CONTAINING STABILIZED AGGREGATES OF SMALL CRYSTALLITES OF ZEOLITE Y ASSOCIATED HYDROCARBON CONVERSION PROCESSES

CROSS-REFERENCE TO RELATED APPLICATION

This application claims priority to U.S. Non-Provisional application Ser. No. 13/041,597 filed Mar. 7, 2011, U.S. Provisional Application Ser. No. 61/512,042 filed Jul. 27, 2011, and U.S. Provisional Application Ser. No. 61/512,067 filed Jul. 27, 2011, which are herein incorporated by reference in their entirety.

FIELD

This invention relates to hydrocracking catalysts containing stabilized aggregates of small crystallites of zeolite Y and hydrocarbon conversion processes utilizing such catalysts. Small primary crystallites of zeolite Y can cluster into larger secondary particles, at least 80% of which may comprise at least 5 primary crystallites. When the outer surfaces of the secondary particles are viewed, e.g., in a SEM image, the average size (width/diameter) of the primary crystallites may be about 0.5 μm or less, or about 0.3 micron or less, though the average size of the secondary particles may be about 0.8 μm or more, or about 1.0 μm or more. The silica to alumina ratio of the resulting stabilize zeolite Y products may be 4:1 or more. Methods for stabilizing the aggregates of Y crystals as well as the catalyst synthesis using the aggregated stabilized Y crystals herein are also disclosed. Catalysts and the use of such catalysts in processes for hydrocracking of hydrocarbon feedstocks are also disclosed herein.

BACKGROUND

Zeolite Y, a member of the Faujasite family, is widely used in many catalytic processes such as fluid catalytic cracking (FCC), hydrocracking, aromatics alkylation, and aromatics transalkylation. A particular type of zeolite Y is known as ultra-stable Y zeolite (USY). Typical USY has crystal morphology of non-aggregated and submicrosized crystals and may contain intra-crystal mesopores after post-treatment involving high temperature steaming. The individual submicrosized crystals may have crystal defects which produce variously oriented crystal grains within an individual crystal particle. U.S. Pat. No. 6,284,218 states that such defects include stacking faults and screw defects.

When heavy molecules are catalytically processed, such as in catalytic cracking of heavy gas oil, transport properties (both intra-particle and inter-particle) of the catalyst are important, in order to operate outside of the diffusion limited regime that often leads to coking.

The article by K. Rajagopalan et al., "Influence of Zeolite Particle Size on Selectivity During Fluid Catalytic Cracking", Applied Catalysis, 1986, 23, 69-80, reports that smaller particle size NaY zeolite fluid catalytic cracking (FCC) catalysts exhibited improved activity and selectivity to intermediate cracked products, such as gasoline and light cycle oil. Selectivity differences were said to be explained by considering the effect of diffusion resistance on the rate constants for cracking of gas oil and gasoline.

U.S. Pat. No. 5,620,590 reports that small crystal zeolite Y of less than 1 micron shows activity benefit in hydrocracking compared to larger crystals. However, small crystal zeolites often present problems in manufacturing (e.g., difficulties in filtration and formulation) due to their small particle sizes and low bulk density. Therefore, it is desirable to have zeolites that possess the performance advantages of small particles, while still maintaining the easy processability of large particles. Thus, one ideal zeolite morphology includes large secondary particles (often greater than 1 micron) formed by agglomeration of smaller primary crystallites (often less than, or even much less than, 1 micron). Furthermore, to improve mass transportation rates, zeolite crystals with small size or aggregated crystals containing inter-crystal mesopores can be desirable, e.g., for reducing diffusion limitations.

Conventional zeolite Y tends to have a crystal or primary crystallite size of much greater than 0.1 μm, even greater than 1 μm. Examples of such conventional forms of zeolite Y include U.S. Pat. Nos. 3,343,913, 3,690,823, and 3,808,326, for example. Small crystal size zeolite Y may be prepared by methods disclosed in U.S. Pat. Nos. 3,516,786 and 3,864,282.

Zeolite X, zeolite Y, and natural faujasite have identical structure types and differ only in the ratio of silica to alumina in the final crystal structure. For example, zeolite X is generally referred to as having a $Si/Al_2$ molar ratio of 2-3, whereas zeolite Y is generally referred to as having a $Si/Al_2$ molar ratio of 3-7.

U.S. Pat. Nos. 5,993,773 and 6,306,363 describe various forms of low-silica faujasite zeolite, referred to as LSX, having silica to alumina molar ratios of 1.9-2.1. These patents include SEM photographs showing LSX zeolite particle size and morphology.

In U.S. Pat. No. 6,306,363, it is stated that, when zeolites are observed by a SEM, they may be visible either (1) in the form of non-aggregated primary crystallites only, which are the smallest units of zeolite particles, or (2) in the form of secondary particles which are formed by agglomeration of a plurality of primary crystallites. Primary crystallites of zeolites may have their shapes predetermined, depending upon the type of zeolite. For example, A-type zeolite tends to have a cubic shape, and faujasite-type zeolite tends to have an octahedral shape or a polyhedral shape developed from a generally spherical shape with some angularity, as shown in FIG. 3 of this patent. However, it is possible for faujasite-type zeolites to have other shapes, such as elongated shapes (e.g., rod-like shapes).

Usually, particle sizes distributions of these particles are roughly symmetric about an average peak maximum. A method for obtaining an average particle size from particles having a distribution is described in detail, for example, at pages 1 to 31 of "Powder Engineering Theory", Shigeo Miwa ed., 1981, Nikkan Kogyo Shinbun K. K. The primary crystallite size of the faujasite-type zeolite may be described as a number average particle size of the primary crystallite particle diameters (observed by SEM) as approximated to spheres, which is called the "projected area diameter" or "Heywood diameter".

LSX in U.S. Pat. No. 6,306,363 is described as being of high purity and characterized in its primary crystallite size of at least 0.05 μm and less than 1 μm, which is said to be a fine (small) size, in comparison with previously known forms of LSX, e.g., where the primary crystallite size is from 3-5 μm, and even more generally where it is at least 1 μm. In this patent, it is stated that, when fine LSX of high purity is used, for example, as an adsorbent of various substances, diffusion into the interior will be facilitated, and improvement in various dynamic properties can be expected.

The LSX described in U.S. Pat. No. 5,993,773 is said to be characterized not only by high purity, but also a peculiar primary crystallite size distribution, wherein the primary crystallite size of a smaller set of particles is from 1-8 μm, the primary crystallite size of a larger set of particles is from 5-15 μm, and 90% or more of the particles are in the smaller set. The right hand portion of FIG. 2 of this patent illustrates a large single crystal or primary crystallite having a spherical polyhedral shape with angularity or edges developed.

SUMMARY

A stabilized aggregated form of zeolite Y utilized in the hydrocracking catalysts and associated hydrocarbon conversion processes disclosed herein comprises small primary crystallites and secondary particles of larger size. At least 80%, e.g., at least 90% or at least 95%, of the primary crystallites may be aggregated or clustered to form the secondary particles. The ratio of the average size (width/diameter) of the secondary particles to the average size (width/diameter) of the primary crystallites, when the outer (i.e., external) surfaces of the secondary particles are viewed, may be at least 3:1, for example at least 5:1 or at least 10:1. When the outer surfaces of the secondary particles are viewed, e.g., in an SEM image, the average size of the primary crystallites in a secondary particle may be about 0.5 μm or less, for example about 0.3 μm or less, about 0.2 μm or less, or about 0.1 μm or less, whereas the average size of the secondary particles may be about 0.8 μm or more, for example about 1.0 μm or more or about 2.0 μm or more. At least 80%, e.g., at least 90% or at least 95%, of the aggregated secondary particles may comprise at least 5, for example at least 10, primary crystallites. These primary crystallites and secondary particles as described herein may be observable, e.g., by an SEM under sufficient conditions including appropriate magnification and resolution.

The average sizes of the primary crystallites and secondary particles can be determined, for instance, by viewing one or more sufficient two-dimensional SEM images of the secondary particles and approximating the shape of the primary crystallites and secondary particles roughly as two-dimensional spherical projections (circles). When percentages (e.g., 80%, 90%, 95%, or the like) of primary crystallites and secondary particles are referred to herein, it should be understood that these percentages are based on numbers of these particles. Although SEM images referred to herein do not necessarily depict all of the particles in an entire batch of primary crystallites and secondary particles, it should also be understood that the SEM images referred to herein are viewed as representative of an entire batch of primary crystallites and secondary particles, including even those particles not specifically observed.

The aggregates of zeolite Y of the present invention can have enhanced stability, particularly enhanced thermal and/or hydrothermal stability, relative to the as-synthesized forms of these aggregates. The present stabilized aggregates of zeolite Y, which can advantageously have an alkali metal content less than 4 wt %, can further have different chemical compositions than the as-synthesized forms of these aggregates, which can typically comprise as much as 8 wt % or more alkali metal content.

Thus, without being bound by theory, it is believed that the chemical composition change may be a reason for the increased stability. As such, aggregates of zeolite Y may attain increased stability through one or more of the following treatments: by exchanging alkali metal (e.g., sodium) atoms from the as-synthesized form of the aggregates with an ammonium salt and by calcining the ammonium exchanged aggregates under conditions sufficient to decompose ammonium; by steaming the calcined, ammonium exchanged form of the aggregates under steaming conditions sufficient, e.g., to remove framework aluminum from the zeolite Y crystallites; and/or by contacting (washing) steamed aggregates with an aqueous acid, e.g., to remove non-framework aluminum from the zeolite Y aggregates.

In other preferred embodiments, the aggregates of zeolite Y herein are incorporated into a catalyst by the use of a suitable binder material or mixtures of suitable binder materials. Suitable binder materials include materials selected from metal oxides, zeolites, aluminum phosphates, polymers, carbons, and clays. Most preferable, the binder is comprised of at least one metal oxide, preferably selected from silica, alumina, silica-alumina, amorphous aluminosilicates, boron, titania, and zirconia. Preferably, the binder is selected from silica, alumina, and silica-alumina. In a preferred embodiment, the binder is comprised of pseudoboehmite alumina.

A significant advantage of the present invention over the prior art, is that in the prior art, the zeolite crystals typically require a significant amount of binder material in order to get obtain sufficient mesoporosity which is defined herein as pore diameters from 2 to 30 nm (20 to 300 angstroms, Å) for optimum hydrocracking of hydrocarbon feedstocks. In the present invention, the zeolite is aggregated into a structure containing a high relative mesoporosity and as such, the hydrocracking catalyst can made with very low concentration levels of binders and still maintain the necessary overall mesoporosity of the hydrocracking catalyst. While the catalysts of invention can contain from 0 to 99 wt % binder materials, due to the high mesoporosity of the aggregate Y zeolite, in preferred embodiments, the binders levels can be about 0 to about 80 wt %, more preferably, from about 5 to 50 wt %, or even from about 5 to about 25 wt % of the overall final hydrocracking catalyst. In other preferred embodiments, the hydrocracking catalyst can be less than 50 wt %, more preferably less than 25 wt %, and most preferably less than 10 wt % binder materials. As noted, in embodiments, the aggregated Y zeolites of the present invention may be used as the final catalyst without any binder materials.

The high relative mesoporosity of the catalysts of invention are indicated by the high Relative External Surface Areas of the catalysts. The Relative External Surface Area is defined herein as:

$$\text{Relative External Surface Area} = \frac{BET \text{ External Surface Area}}{BET \text{ Total Surface Area}} \quad [1]$$

In preferred embodiments of the hydrocracking catalysts of invention herein, the catalyst has a Relative External Surface Area of at least 0.35, more preferably at least 0.50. In preferred embodiments of the hydrocracking catalysts of invention herein, the catalyst has a low BET surface area of less than 600 m$^2$/g; more preferably less than 500 m$^2$/g, and most preferably less than 450 m$^2$/g. In other preferred embodiments of the catalysts of invention herein, the average pore diameter of the catalyst is at least 7.0 nanometers (nm), preferably at least 7.5 nm, more preferably at least 8.0 nm, and most preferably at least 9.0 nm.

In other preferred embodiments, the catalyst may contain additional zeolites or molecular sieves. In a preferred embodiment, the catalyst further comprises at least one of the following molecular sieves: beta, ZSM-5, ZSM-11, ZSM-57, MCM-22, MCM-49, MCM-56, ITQ-7, ITQ-27, ZSM-48, mordenite, zeolite L, ferrierite, ZSM-23, MCM-68, SSZ-26/-33, CIT-1, SAPO-37, ZSM-12, ZSM-18, and EMT faujasites. In more preferred embodiments, the catalyst comprises at least one of the following molecular sieves: beta, ZSM-5, ZSM-48, mordenite, and zeolite L. The molecular sieves listed above can be present in the as-synthesized form, or alternatively, can be post-modified chemically, thermally, or mechanically to create a stabilized form of the material.

The aggregates of zeolite Y, binder and additional components may be extruded, spray dried, or otherwise shaped into a catalyst particle for use in hydroconversion processes described herein. In preferred embodiments of the hydrocracking catalysts herein, the final catalyst contains an active Group VIA and/or Group VIIIA metal. In a preferred embodiment, the hydrocracking catalyst is comprised of at least one Group VIA metal selected from Mo and W, and at least one Group VIIIA metal selected from Ni and Co. In another preferred embodiment, the hydrocracking catalyst is comprised at least one Group VIIIA metal selected from Pt, Pd, Rh and Ru. In another preferred embodiment, the hydrocracking catalyst is comprised at least one Group VIIIA metal selected from Pt and Pd. In a preferred embodiment, the Group VIA metal is Mo and the Group VIIIA metal is Co. In another preferred embodiment, the hydrocracking catalyst is comprised of Pt. The active Group VIA or Group VIIIA metals may be incorporated into the catalyst by any technique known in the art. A preferred technique for active metal incorporation into the catalyst herein is the incipient wetness technique.

DETAILED DESCRIPTION OF THE EMBODIMENTS

Aggregated Y Zeolite (Meso-Y)

Figure 1B:
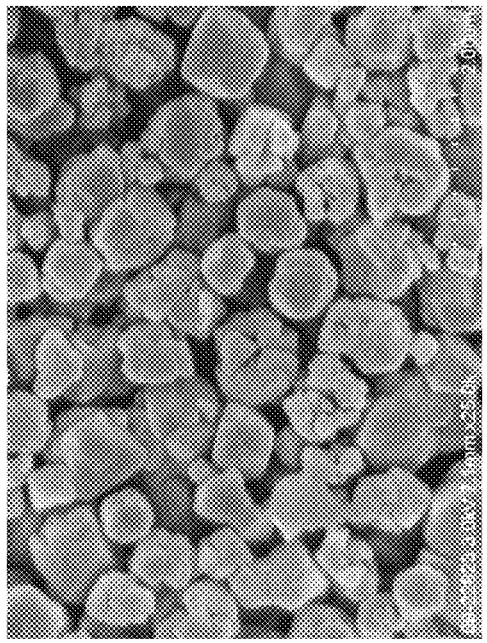
FIGS. 1A & 1B show scanning electron microscope (SEM) images of comparative non-aggregated NaY samples prepared according to Examples 1A & 1B.

Smaller crystallites of zeolite Y can be clustered into discrete, larger particle size bodies. The smaller particle size crystallites are also referred to herein as primary crystallites or primary particles. The clusters of these primary crystallites are also referred to herein as secondary particles, aggregates, and/or agglomerates. In certain cases herein, the zeolite Y can alternately be described as Mesoporous-Y (Meso-Y).

The secondary particles may be essentially uniform in size. For instance, at least 80%, e.g., at least 90% or at least 95%, of the sizes of the secondary particles may vary on average by no more than ~0.5 micron, for example no more than ~0.3 micron or no more than ~0.1 micron, as observed by SEM, measuring average diameters as approximated using spherical secondary particulate shapes.

As indicated by the spherical approximations for size (width/diameter) determinations, the secondary particles may be essentially spherical in shape. For instance, at least 80%, e.g., at least 90% or at least 95%, of the secondary particles may have an aspect ratio of between 0.7 and 1, for example, between 0.8 and 1. Aspect ratio may be calculated by dividing the shortest cross-sectional dimension of a secondary particle by the longest cross-sectional dimension of the secondary particle, as observed by SEM. The secondary particles may appear as clusters of primary particles, having a broccoli-like morphology/appearance.

The primary crystallites may have a non-spherical shape. For example, the primary crystallites may have a smooth or roughened octahedral shape, which is more or less typical of certain faujasite type zeolite crystals. However, the primary crystallites may have other less common shapes, such as elongated or rod-like shapes.

When secondary particles are viewed, for example using SEM techniques, only the exterior surfaces or shells of the secondary particles are typically visible. Consequently, the entire crystal morphology of the primary crystallites, as well as of the interior of the secondary particles, is not usually observed visually. Accordingly, the secondary particles of the present invention may possess or lack primary crystallites in the interior regions of the secondary particles, which cannot be observed by SEM. Additionally or alternatively, some or all of the primary crystallites may or may not be elongated along an axis extending from the center of the secondary particles to the center of the surface of each crystallite, as observed using SEM.

In aggregates of individual primary crystallites, spaces can exist among individual primary crystallites, thus providing pore spaces, especially mesopores. In contrast, stacking faults within an individual crystallite tend not to provide pore spaces. One or more stacking faults may exist within any individual primary crystallite.

The secondary particles may possess an external surface area of about 10 $m^2/g$ or more, for example, about 20 $m^2/g$ or more or about 40 $m^2/g$ or more, especially after undergoing calcination and/or steaming. Conventional forms of zeolite Y, such as those having non-aggregated primary crystallites with a size of 1 micron or more, tend to have an external surface area of less than 10 $m^2/g$. The relatively high external surface area of the secondary particles can be an indication generally of porous gaps between individual primary crystallites, and specifically of mesopores in the internal regions of the secondary particles. A single crystal of comparable size in the form of a generally spherical shape (with angularity or edges developed) would be expected to have a smaller external surface area.

The centers of the secondary particles may, in certain cases, be less dense than the edges of the secondary particles, as measured by SEM or TEM. This lack of density in the centers of the secondary particles can be a further indication that these secondary particles are indeed an aggregation of primary crystallites, rather than a single large crystal.

Elemental mapping of secondary particles may reveal that the Si/Al ratio can be relatively uniform throughout the secondary particles. Such a uniform Si/Al ratio can provide further indication that these secondary particles are indeed an aggregation of primary crystallites, rather than a single large crystal or large particles with an aluminum-, or a silicon-, rich (amorphous) core.

The zeolite Y in the aggregates may have a silica-to-alumina ($Si/Al_2$) ratio of at least 4 (i.e., at least 4:1), for example of at least 4.5, of at least 5, or from 5 to 6. In more preferred embodiments the aggregated zeolite Y has a silica-to-alumina ($Si/Al_2$) ratio of at least 10, more preferably, at least 25, and even more preferably at least 50. It should be noted that these versions of high silica-to-alumina ($Si/Al_2$) ratio are particularly useful and desired when the binder in the catalyst (as described further below) is at binder content levels of less than about 50 wt %, or even more preferably less than about 25 wt %, of the overall final catalyst.

The aggregated form of zeolite Y may have a mesopore volume of at least 0.025 $cm^3$/gram (abbreviated cc/g herein), particularly in the inter-crystalline regions of the aggregates. Non-aggregated forms of zeolite Y thus tend to lack mesopores (which are defined herein as pores having a diameter from about 20 to about 300 Angstroms). The unit cell size (UCS) of the zeolite Y can be 25 Angstroms or less, e.g., between 24 and 25 Angstroms.

Small size zeolite Y can be prepared using a reaction mixture containing a source of alumina, a source of silica, a source of sodium ions, a source of water, and optionally a source of hydroxyl ions. Although the reaction mixture is described as containing sources of alumina and silica, it should be understood that these are actually sources of aluminum atoms and silicon atoms, respectively. Nevertheless, since the zeolite Y structure is usually described in terms of oxidized versions of these atoms, and indeed to facilitate the standard characterization of such zeolitic structures with respect to ratios of silica to alumina, and the like, the sources are referred to herein for convenience in their oxidized forms.

Sources of alumina for preparing aggregates of small size zeolite Y can be in the form of a soluble salt, for example a sodium salt of alumina, e.g. sodium aluminate, such as commercially available from US Aluminate. Other suitable alumina sources can additionally or alternately include other aluminum salts, such as the chloride, sulfate aluminum alkoxides, hydrated aluminas such as gamma alumina, pseudoboehmite, and colloidal alumina, and the like, and combinations thereof.

The silica source for preparing aggregates of small size zeolite Y can be a precipitated silica, such as Ultrasil®, which is commercially available from Evonik Degussa. Other suitable silica sources can additionally or alternately include powdered silica (including precipitated silica, such as Ultrasil PM Modified® and/or Zeosil®, as well as silica gels), silicic acid, colloidal silica (such as Ludox®), dissolved silica, and the like, and combinations thereof. In the presence of a base, certain silica sources may form silicates. According to certain particular embodiments exemplified herein, a sodium silicate solution can further additionally or alternately be used as a source of silica. Still further additionally or alternately, a precipitated silica (particularly Ultrasil PM Modified®, Ultrasil®, and/or Sipernat®) can be used as a source of silica. Especially in, but not limited to, situations where a precipitated silica is used as a preferred source of silica, the reaction mixture for forming the aggregates of small size zeolite Y can comprise one or more of a $Si/Al_2$ molar ratio of about 10 or more, an $H_2O/Si$ molar ratio of about 15 or less, and an OFT/Si molar ratio of about 0.85 or less. Additionally or alternately, the reaction mixture for forming the aggregates of small size zeolite Y may comprise one or more of a silica to alumina molar ratio from about 10 to about 20, an $H_2O/SiO_2$ molar ratio from about 10 to about 20, when hydroxyl ion sources are present an $OH^-/SiO_2$ molar ratio from about 0.5 to about 1.0, and a $Na^+/SiO_2$ molar ratio from about 0.5 to about 1.0.

In the hydrocracking catalysts of the present invention, the thermal and hydrothermal stability of the aggregates of zeolite Y can be improved by removal of aluminum from the aggregates, by high temperature steaming. This is illustrated further in Examples 7A-B and 8A-B of the disclosure herein.

Forms of the present aggregates of zeolite Y, such as the as-synthesized forms, may be subjected to other various treatments to remove structural aluminum therefrom. Many of these techniques rely upon the removal of aluminum from the structural framework of the zeolite by chemical agents appropriate to this end. A considerable amount of work on the preparation of aluminum-deficient faujasites has been performed and is reviewed in Advances in Chemistry Series No. 121, Molecular Sieves, G. T. Kerr, American Chemical Society, 1973. Specific methods for preparing dealuminized zeolites are described in the following, and reference is made to them for details of the method, which are hereby incorporated by reference herein: Catalysis by Zeolites ((International Symposium on Zeolites, Lyon, Sep. 9-11, 1980), Elsevier Scientific Publishing Co., Amsterdam, 1980 (dealuminization of zeolite Y with silicon tetrachloride); U.S. Pat. No. 3,442,795 and Great Britain U.S. Pat. No. 1,058,188 (hydrolysis and removal of aluminum by chelation); Great Britain U.S. Pat. No. 1,061,847 (acid extraction of aluminum); U.S. Pat. No. 3,493,519 (aluminum removal by steaming and chelation); U.S. Pat. No. 3,591,488 (aluminum removal by steaming); U.S. Pat. No. 4,273,753 (dealuminization by silicon halide and oxyhalides); U.S. Pat. No. 3,691,099 (aluminum extraction with acid); U.S. Pat. No. 4,093,560 (dealumination by treatment with salts); U.S. Pat. No. 3,937,791 (aluminum removal with Cr(III) solutions); U.S. Pat. No. 3,506,400 (steaming followed by chelation); U.S. Pat. No. 3,640,681 (extraction of aluminum with acetylacetonate followed by dehydroxylation); U.S. Pat. No. 3,836,561 (removal of aluminum with acid); German Patent No. 2,510,740 (treatment of zeolite with chlorine or chlorine-contrary gases at high temperatures), Netherlands Patent No. 7,604,264 (acid extraction), Japanese Publication No. 53,101,003 A (treatment with EDTA or other materials to remove aluminum); and *J. Catalysis*, 54, 295 (1978) (hydrothermal treatment followed by acid extraction), inter alia.

Highly siliceous forms of zeolite Y may be prepared by steaming and/or by acid extraction of structural aluminum, but, because zeolite Y in its usual as-synthesized condition tends to be relatively unstable to acid, it must first be converted to an acid-stable form. Methods for doing this are known, and one of the most common forms of acid-resistant zeolite Y is known as "Ultrastable Y" (USY), e.g., as described in U.S. Pat. Nos. 3,293,192 and 3,402,996 and in Society of Chemical Engineering (London) Monograph Molecular Sieves, page 186 (1968), by C. V. McDaniel and P. K. Maher, each of which are hereby incorporated by reference herein for details of the zeolite and preparation. In general, "ultrastable" refers to Y-type zeolite that is highly resistant to degradation of crystallinity by high temperature and steam treatment and that can be characterized by an $R_2O$ content (wherein R is Na, K, or any other Group 1 metal ion) of less than 4 wt % (for example less than 2 wt %, preferably less than 1 wt %), a unit cell size less than 24.5 Angstroms, and a silica to alumina mole ratio in the range of 3.5 to 7 or higher.

The ultrastable form of Y-type zeolite can be obtained primarily by a substantial reduction of the alkali metal (Group 1) ion content and of the unit cell size. The ultrastable zeolite Y can be identified both by the smaller unit cell and the low alkali metal content in the crystal structure.

In certain embodiments, the ultrastable form of the Y-type zeolite can be prepared by successively base exchanging a Y-type zeolite with an aqueous solution of an ammonium salt, such as ammonium nitrate, until the alkali metal content of the Y-type zeolite is reduced to less than 4 wt %. The base exchanged zeolite can then be calcined at appropriate conditions (e.g., at a temperature from about 540° C. to about 800° C. for up to several hours), cooled, and successively base exchanged again with an aqueous solution of an ammonium salt until the alkali metal content is reduced to less than ~1 wt % (e.g., less than ~0.5 wt %), which can be followed by washing and calcination again at appropriate conditions to produce an ultrastable zeolite Y. The sequence of ion exchange and heat treatment can result in the substantial reduction of the alkali metal content of the original zeolite and can also advantageously result in a unit cell shrinkage, which is believed to lead to the rather high stability of the resulting Y-type zeolite.

The ultrastable zeolite Y may then be extracted, e.g., with acid to remove extra-framework aluminum containing species, to produce a highly siliceous form of the zeolite. Methods for increasing the silica to alumina ratio of zeolite Y by acid extraction are described, e.g., in U.S. Pat. Nos. 4,218,307, 3,591,488, and 3,691,099, which are each incorporated herein by reference for details of these methods.

Meso-Y Hydrocracking Catalyst

It has been noted that the aggregated Y zeolite ("Meso-Y") zeolites herein may be used as catalysts without the use of any binder materials or with the use of very low amounts of binders materials as compared to the prior art. This is mainly due to the fact that the aggregation of the crystal structures in the Meso-Y zeolite impart into the base Meso-Y zeolite aggregated crystal (i.e., catalyst as zeolite alone) with sufficient mesoporosity as to not require any, or conversely, very low amounts, of binder materials as it is know that the binder materials tend impart most of the mesoporosity required for a high activity, selective hydrocracking catalyst.

However, in preferred embodiments of the hydrocracking catalysts herein, it is desirable to incorporate the present aggregates of zeolite Y with a binder material to impart resistance to the temperatures and other conditions employed in the hydrocarbon conversion processes as well as to enable the catalyst to be formed into catalyst particles of suitable size and stability for the hydrocracking process apparatus and process conditions. In these preferred catalyst embodiments, the aggregates of zeolite Y herein are incorporated into a catalyst by the use of a suitable binder material. Suitable binder materials include materials selected from metal oxides, zeolites, aluminum phosphates, polymers, carbons, and clays. Most preferable, the binder is comprised of at least one metal oxide, preferably selected from silica, alumina, silica-alumina, amorphous aluminosilicates, boron, titania, and zirconia. Preferably, the binder is selected from silica, alumina, and silica-alumina. In a preferred embodiment, the binder is comprised of pseudoboehmite alumina.

While the catalysts of invention can contain from 0 to 99 wt % binder materials, due to the high mesoporosity of the aggregate Y zeolite, in preferred embodiments, the binders levels can be about 0 to about 80 wt %, more preferably, from about 5 to 50 wt %, or even from about 5 to about 25 wt % of the overall final hydrocracking catalyst. In other preferred embodiments, the hydrocracking catalyst can be less than 50 wt %, more preferably less than 25 wt %, and most preferably less than 10 wt % binder materials. As noted, in embodiments, the aggregated Y zeolites of the present invention may be used as the final catalyst without any binder materials.

As noted prior, in these low binder content versions of the hydrocracking catalysts herein, (i.e., ranges wherein the binder content is in the ranges of 50 wt % or less), it is preferred that versions of the Meso-Y with relatively high silica-to-alumina ($Si/Al_2$) ratio are utilized (i.e., ranges wherein the silica-to-alumina ($Si/Al_2$) ratio of the Meso-Y is in ranges stated encompassing at least 10 or greater (e.g., at least 10, or 25, or 50).

As noted, a significant advantage of the present invention over the prior art, is that in the prior art, the zeolite crystals typically require a significant amount of binder material in order to get obtain sufficient mesoporosity which is defined herein as pore diameters from 2 to 30 nm (20 to 300 angstroms, Å) for optimum hydrocracking of hydrocarbon feedstocks. In the present invention, the zeolite is aggregated into a structure containing a high relative mesoporosity and as such, the hydrocracking catalyst can made with very low concentration levels of binders and still maintain the necessary overall mesoporosity of the hydrocracking catalyst. The high relative mesoporosity of the catalysts of invention are indicated by the high Relative External Surface Areas of the catalysts as noted in equation [1] herein.

In preferred embodiments of the hydrocracking catalysts of invention herein, the catalyst has a low BET surface area of less than 600 $m^2/g$; more preferably less than 500 $m^2/g$, and most preferably less than 450 $m^2/g$. As can be seen in the data in Table 3 of Example 8A-B herein, the embodiments of the catalysts of invention (as shown in embodiments MesoY-A and MesoY-B) have very low total surface areas compared to the catalysts of the prior art while maintaining external surface areas near those of the prior art. This contributes to high diesel hydrocracking selectivity. In preferred embodiments of the hydrocracking catalysts of invention herein, the catalyst has a Relative External Surface Areas, as noted in equation [1] herein, of at least 0.35, more preferably at least 0.50.

The catalysts of invention additionally have significantly higher average pore diameters than the conventional USY catalysts. This is indicative of the high mesoporosity inherent in both the Meso-Y zeolite and the resultant hydrocracking catalysts. In preferred embodiments of the catalysts of invention herein, the average pore diameter of the catalyst (as measured by nitrogen desorption) is at least 7.0 nanometers (nm), preferably at least 7.5 nm, more preferably at least 8.0 nm, and most preferably at least 9.0 nm. This aspect of the catalysts of invention (as exemplified by MesoY-A and MesoY-B) is further exemplified in Examples 8A-B and associated data in Table 3. These catalyst aspects contribute to high diesel selectivity in the catalysts of invention.

The hydrocracking catalysts of invention are particularly beneficial for diesel production when the catalyst has bath a high Relative External Surface Area as noted prior in conjunction with a low Alpha Value as is noted in the catalyst property data associated with Examples 8A-B. In preferred embodiments of the hydrocracking catalyst of invention, the Alpha Value for the catalyst is less than 15, more preferably less than 10, and most preferably less than 5.

In other preferred embodiments, the catalyst may contain additional zeolites or molecular sieves. In a preferred embodiment, the catalyst further comprises at least one of the following zeolites or molecular sieves. In a preferred embodiment, the catalyst further comprises at least one of the following molecular sieves: beta, ZSM-5, ZSM-11, ZSM-57, MCM-22, MCM-49, MCM-56, ITQ-7, ITQ-27, ZSM-48, mordenite, zeolite L, ferrierite, ZSM-23, MCM-68, SSZ-26/-33, CIT-1, SAPO-37, ZSM-12, ZSM-18, and EMT faujasites. In more preferred embodiments, the catalyst comprises at least one of the following molecular sieves: beta, ZSM-5, ZSM-48, mordenite, and zeolite L. The molecular sieves listed above can be present in the as-synthesized form, or alternatively, can be post-modified chemically, thermally, or mechanically to create a stabilized form of the material.

In preferred embodiments, the hydrocracking catalyst of the invention herein contains the Meso-Y zeolite in an amount of at least 10 wt %, more preferably at least at least 25 wt %, and even more preferably at least at least 35 wt % based on the finished catalyst, particularly when a binder is utilized. However, as noted, due to the high mesoporosity and larger particle size of the aggregated crystals, the Meso-Y zeolite may be present in hydrocracking catalysts in an amount of at least 50 wt %, or even at least 75 wt %, based on the finished catalyst.

In preferred embodiments of the hydrocracking catalyst, the aggregates of zeolite Y (Meso-Y) are combined with at least one metal oxide binder (as described prior) and further with at least one hydrogenating metal component, in order to form a catalyst suitable for hydrocracking. Examples of such hydrogenating metal components can include one or more noble metals or one or more non-noble metals.

The aggregates of zeolite Y, binder and additional components may be extruded, spray-dried, or otherwise shaped into a catalyst particle for use in hydroconversion processes described herein. In preferred embodiments of the hydrocracking catalysts herein, the final catalyst contains an active Group VIA and/or Group VIIIA metal. In a preferred embodiment, the hydrocracking catalyst is comprised of at least one Group VIA metal selected from Mo and W, and at least one Group VIIIA metal selected from Ni and Co. In a preferred embodiment, the Group VIA metal is Mo and the Group VIIIA metal is Co. In another preferred embodiment, the hydrocracking catalyst is comprised at least one Group VIIIA metal selected from Pt, Pd, Rh and Ru (noble metals). In another preferred embodiment, the hydrocracking catalyst is comprised at least one Group VIIIA metal selected from Pt and Pd. In another preferred embodiment, the hydrocracking catalyst is comprised of Pt. The active Group VIA or Group VIIIA metals may be incorporated into the catalyst by any technique known in the art. A preferred technique for active metal incorporation into the catalyst herein is the incipient wetness technique.

Please note that the designation of Group VIA and Group VIIIA herein corresponds to the older IUPAC designations such as shown in the Periodic Table of Elements, published by the Sargent-Welch Scientific Company, 1979, wherein the Group VIA elements include the column from the periodic table of elements containing Cr, Mo, and W, and the Group VIIIA elements include the columns from the periodic table of elements containing Fe, Co, Ni, Ru, Rh, Pd, Os, Ir, and Pt.

The amount of hydrogenation metal in the catalyst can be at least 0.1 wt % based on catalyst, or at least 0.15 wt %, or at least 0.2 wt %, or at least 0.25 wt %, or at least 0.3 wt %, or at least 0.5 wt % based on the catalyst. For embodiments where the Group VIIIA metal is Pt, Pd, Rh, Ru, or a combination thereof, the amount of metal is preferably from 0.1 to 5 wt %, more preferably from 0.2 to 4 wt %, and even more preferably from 0.25 to 3.5 wt %. For embodiments where the metal is a combination of a non-noble Group VIIIA non-noble metal with a Group VIA metal, the combined amount of metal is preferably from 0.25 wt % to 40 wt %, more preferably from 0.3 wt % to 35 wt %, and even more preferably from 1 wt % to 25 wt %.

Other preferred non-noble metals and non-noble metal combinations utilized in the hydrocracking catalysts herein can include chromium, molybdenum, tungsten, cobalt, nickel, and combinations thereof, such as cobalt-molybdenum, nickel-molybdenum, nickel-tungsten, cobalt-tungsten, cobalt-nickel-molybdenum, cobalt-nickel-tungsten, nickel-molybdenum-tungsten, and cobalt-molybdenum-tungsten. Non-noble metal components may be pre-sulfided prior to use by exposure to a sulfur-containing gas (such as hydrogen sulfide) or liquid (such as a sulfur-containing hydrocarbon stream, e.g., derived from crude oil and/or spiked with an appropriate organosulfur compound) at an elevated temperature to convert the oxide form to the corresponding sulfide form of the metal.

Hydrocracking Processes

The embodiments of the hydrocracking catalysts described herein incorporating the aggregated Y zeolite (or "Meso-Y") are utilized in processes for conversion of heavy hydrocarbon feedstocks into lighter, more valuable hydrocarbon products (such, as gasoline, kerosene, and diesel products). The catalysts herein have been unexpectedly found to possess very high selectivities toward diesel production (i.e., increased yield volumes) when utilized under hydrocracking conditions. As is well, known, increased diesel production is a main focus of refineries in the United States (and even more particularly in the markets of Europe and Asia), as the vehicle pool is ever shifting more toward higher mileage diesel powered vehicles as compared to less efficient gasoline powered engines.

In these hydrocracking processes, the hydrocarbon feedstock to be hydrocracked may include, in whole or in part, a gasoil (e.g., light, medium, heavy, vacuum, and/or atmospheric) having an initial boiling point above about 400° F. (204° C.), a T50 boiling point (i.e., the point at which approximately 50 percent by weight boils, or becomes or is gaseous, under atmospheric pressure) of at least about 500° F. (260° C.), and an end boiling point of at least about 600° F. (315° C.). However, as noted, the hydrocracking catalysts of invention are particularly useful in maximizing diesel production (400° F. to 700° F. boiling range products) from higher boiling point feedstocks. As such, in preferred embodiments of the present invention, the hydrocarbon feedstock contains at least 25 wt %, more preferably at least 50 wt %, and even more preferably, at least 75 wt % hydrocarbons with boiling points above 700° F. (371° C.). In preferred embodiments, it is preferred that the portion the hydrocarbon feedstock boiling above 700° F. (371° C.) has a T50 boiling point above 800° F. (427° C.), more preferably above 825° F. (441° C.), and most preferably above 850° F. (454° C.).

The feedstock can include one or more of thermal oils, residual oils, cycle stocks, whole top crudes, partial crudes, tar sand oils, shale oils, synthetic fuels, heavy hydrocarbon fractions derived from the destructive hydrogenation of coal, tar, pitches, and/or asphalts, hydrotreated feedstocks derived therefrom, and the like. As should be appreciated by those skilled in the art, the distillation of higher boiling petroleum fractions above about 750° F. (399° C.) can generally be carried out under vacuum (i.e., at subatmospheric pressure), typically to avoid thermal cracking. The boiling temperatures utilized herein are thus conveniently expressed in terms of the boiling point corrected to atmospheric pressure. Further additionally or alternately, resid compositions and/or deeper cut gasoils, such as with relatively high metals contents, can be cracked using catalysts employing the aggregated zeolite materials of the invention.

In such processes envisioned utilizing the hydrocracking catalysts of invention herein, a hydrocarbon feedstock is contacted with embodiments of the Meso-Y-containing hydrocracking catalysts disclosed and described herein under hydrocracking conditions. In the processes herein, it is desired to maximize the amount of diesel product (i.e., hydrocarbon with boiling points in the range of 400 to 700° F.) produced in the hydrocracking conversion process.

The contacting of the hydrocarbon feedstock with the Meso-Y-containing hydrocracking catalysts is typically performed in a hydrocracker reactor in eth presence of excess hydrogen gas. The hydrocracking process may contain one or more reactor stages in series, but most preferably, there is either one or two reactor stages, but each stage may contain one or more reactor vessels. In preferred embodiments of the present invention, there are at least two reactor stages, with the first reactor stage being operated at a total pressure of at least 250 psig, more preferably at least 500 psig, higher than the second reactor stage. Even more preferably, hydrocracking process comprises an intermediate vapor separation between the first reactor stage and the second reactor stage in which at least a portion of the hydrogen gas from the first reactor stage effluent is removed. In more preferred embodiments, at least a portion of the hydrogen gas removed in the intermediate vapor separation step is recycled to the first reactor stage.

Preferred hydrocracking operating conditions herein include a reaction temperature from about 550° F. (about 288° C.) to about 800° F. (about 427° C.); a total pressure from about 300 psig (about 2.1 MPag) to about 3000 psig (about 20.7 MPag), more preferably from about 700 psig (about 4.8 MPag) to about 2500 psig (about 17.2 MPag); an LHSV from about 0.1 hr$^{-1}$ to about 20 hr$^{-1}$, preferably from about 0.2 hr$^{-1}$ to about 10 hr$^{-1}$; and a hydrogen treat gas rate from about 500 scf/bbl (about 85 Nm$^3$/m$^3$) to about 10000 scf/bbl (about 1700 Nm$^3$/m$^3$), preferably from about 750 scf/bbl (about 130 Nm$^3$/m$^3$) to about 7000 scf/bbl (about 1200 Nm$^3$/m$^3$), more preferably from about 1000 scf/bbl (about 170 Nm$^3$/m$^3$) to about 5000 scf/bbl (about 850 Nm$^3$/m$^3$).

Examples 7A-B and 8A-B herein show the high diesel selectivity present in the hydrocracking catalyst of the present invention. As can be seen in Example 8A-B and the product data in corresponding FIGS. 8 and 9 herein, in preferred embodiments of the hydrocracking catalysts herein, at least 30 wt %, for example at least 35 wt %, or at least 40 wt % of the 700° F. feed is converted into diesel boiling range products (i.e., 400 to 700° F. boiling range hydrocarbons). In preferred embodiments of the hydrocracking catalysts herein, the diesel selectivity (i.e., the % diesel product/% 700° F.+ conversion) is at least 30, more preferably at least 40, and most preferably at least 50. The formula for calculating diesel selectivity is shown in equation [2] in Examples 8A-B.

While not wishing to be held to any particular theory, it is believed that the propensity for diesel selectivity in the catalysts of invention may be due in part to the low Alpha value properties of the catalysts of invention. The Alpha values are a measure of the degree of hexane cracking activity in a catalyst, with the higher Alpha values tending to result in higher relative cracking activity (or conversion) in the catalyst. The Alpha Value is an approximate indication of the catalytic cracking activity of the catalyst compared to a standard catalyst, and it gives the relative rate constant (rate of normal hexane conversion per volume of catalyst per unit time). It is based on the activity of silica-alumina cracking catalyst taken as an Alpha of 1 (Rate Constant≈0.016 sec$^{-1}$). The test for Alpha Value is described in U.S. Pat. No. 3,354,078 and in the *Journal of Catalysis* at 4, 527 (1965); 6, 278 (1966); and 61, 395 (1980), each incorporated herein by reference as to the relevant description. The experimental conditions of the Alpha Value test used herein include a constant temperature of about 538° C. and a variable flow rate as described in detail in the 1980 reference.

It has been discovered that the Meso-Y containing hydrocracking catalysts of invention have extremely low Alpha values as can be seen in the catalyst property data shown in Table 3 of Example 8A-B. As can be seen, the Alpha values of the MesoY-A and MesoY-B catalysts have alpha values of less than 5 or 10, while the comparative USY catalysts have alpha values over 20. It is believed that these lower Alpha values contribute to the selective diesel products of the catalysts of the present invention. In preferred embodiments of the Meso-Y hydrocracking catalysts herein, the Alpha values for the catalysts are preferably less than 15, more preferably less than 10, and even more preferably less than 5.

EXAMPLES

Comparative Example 1A

Non-aggregated NaY Recipe Under Static Conditions

A mixture was prepared from ~885 grams of water, ~262 grams of Ultrasil® silica, ~150 grams of sodium aluminate solution (45% in water), and ~167 grams of 50% sodium hydroxide solution (in water). The mixture had the following molar composition:

| | |
|---|---|
| $SiO_2/Al_2O_3$ | ~10.6 |
| $H_2O/SiO_2$ | ~15.1 |
| $OH^-/SiO_2$ | ~0.76 |
| $Na^+/SiO_2$ | ~0.76 |

Figure 1A:
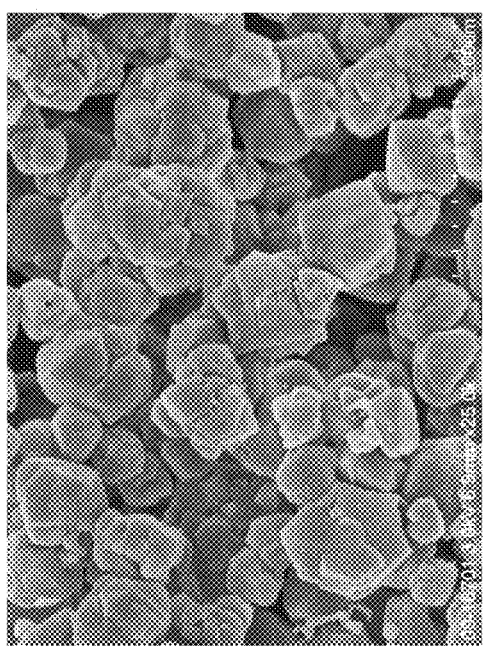

The mixture was first aged at room temperature (about 20-25° C.) for about 24 hours, while stirring at ~250 rpm. Then, the aged mixture was reacted at ~200° F. (~93° C.) in a ~2-liter autoclave without stirring for ~24 more hours. The product was filtered, washed with deionized (DI) water, and dried at ~250° F. (~120° C.). The X-ray diffraction pattern (XRD) pattern of the as-synthesized product material showed the typical phase of zeolite Y crystal topology. The SEM image of the as-synthesized product material showed that the material was composed of typical non-aggregated Y crystals, as shown in FIG. 1A. The as-synthesized Y crystals had a $SiO_2/Al_2O_3$ molar ratio of ~5.0 (measured at 4.96).

Comparative Example 1B

Non-aggregated NaY Recipe with Stirring

A mixture was prepared from ~885 grams of water, ~262 grams of Ultrasil® silica, ~150 grams of sodium aluminate solution (45% in water), and ~167 grams of 50% sodium hydroxide solution (in water). The mixture had the following molar composition:

| | |
|---|---|
| $SiO_2/Al_2O_3$ | ~10.6 |
| $H_2O/SiO_2$ | ~15.1 |
| $OH^-/SiO_2$ | ~0.76 |
| $Na^+/SiO_2$ | ~0.76 |

The mixture was first aged at room temperature (about 20-25° C.) for about 24 hours, while stirring at ~250 rpm. Then, the aged mixture was reacted at ~200° F. (~93° C.) in a ~2-liter autoclave, while stirring at ~250 rpm, for ~24 more hours. The product was filtered, washed with deionized (DI) water, and dried at ~250° F. (~120° C.). The X-ray diffraction (XRD) pattern of the as-synthesized product material showed the typical phase of zeolite Y crystal topology with a trace of impurity phase of Gmelinite. The SEM image of the as-synthesized product material showed that the material was composed of typical non-aggregated Y crystals, of the type shown in FIG. 1B. The as-synthesized Y crystals had a $SiO_2/Al_2O_3$ molar ratio of ~5.12. No major differences in crystal size and morphology were observed compared with product of Comparative Example 1A based on the SEM data.

Example 2

Preparation of Aggregated NaY (Meso-Y) Crystals

A mixture was prepared from ~728 grams of water, ~275 grams of Ultrasil® silica, ~166 grams of sodium aluminate solution (45% in water), and ~120 grams of 50% sodium hydroxide solution (in water). The mixture had the following molar composition:

| | |
|---|---|
| $SiO_2/Al_2O_3$ | ~10.1 |
| $H_2O/SiO_2$ | ~12.1 |
| $OH^-/SiO_2$ | ~0.60 |
| $Na^+/SiO_2$ | ~0.60 |

Figure 2:
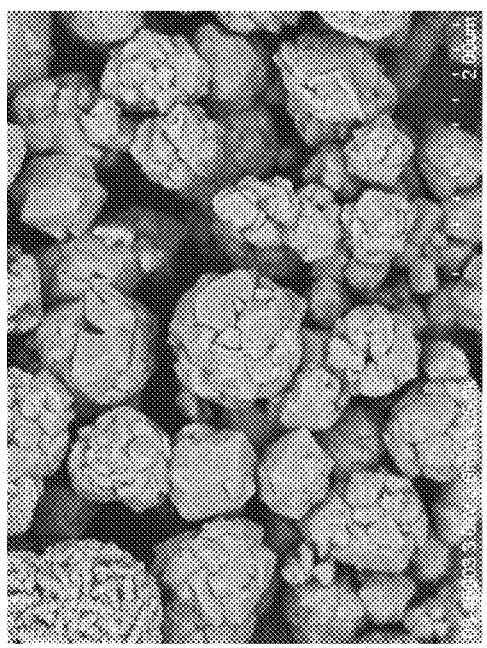
FIG. 2 shows a scanning electron microscope (SEM) image of a sample comprising a mixture of aggregated & non-aggregated NaY prepared according to Example 2.

The mixture was first aged at room temperature (about 20-25° C.) for about 24 hours, while stirring at ~250 rpm. Then, the aged mixture was reacted at ~176° F. (~80° C.) in a ~2-liter autoclave, while stirring at ~250 rpm, for ~192 more hours. The product was filtered, washed with deionized (DI) water, and dried at ~250° F. (~120° C.). The X-ray diffraction (XRD) pattern of the as-synthesized product material showed the typical phase of zeolite Y crystal topology with a very small trace of impurity phase of Gmelinite. The SEM image of the as-synthesized product material showed that the material was composed of aggregates of small crystals and non-aggregated crystals, as shown in FIG. 2. The as-synthesized Meso-Y crystals had a $SiO_2/Al_2O_3$ molar ratio of ~5.54 and a unit cell size (UCS) of approximately 24.61 Angstroms.

Example 3

Preparation of Aggregated NaY (Meso-Y) Crystals

A mixture was prepared from ~830 grams of water, ~258 grams of Ultrasil® silica, ~96 grams of sodium aluminate solution (45% in water), and ~180 g of 50% sodium hydroxide solution (in water). The mixture had the following molar composition:

| | |
|---|---|
| $SiO_2/Al_2O_3$ | ~16.2 |
| $H_2O/SiO_2$ | ~14.2 |
| $OH^-/SiO_2$ | ~0.72 |
| $Na^+/SiO_2$ | ~0.72 |

Figure 3:
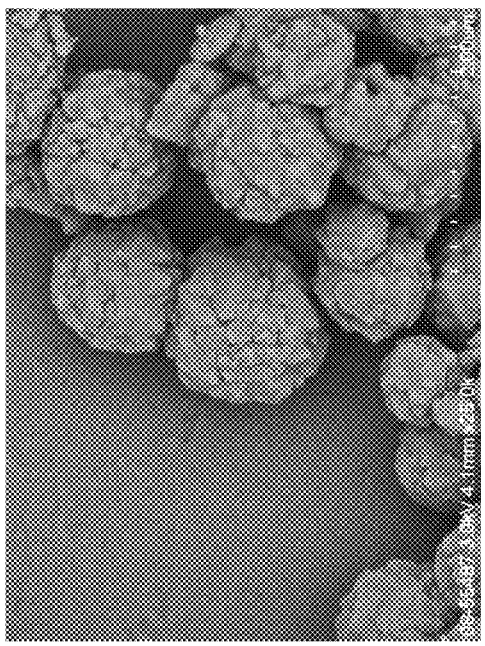
FIG. 3 shows a scanning electron microscope (SEM) image of a highly aggregated NaY sample prepared according to Example 3.

The mixture was first aged at room temperature (about 20-25° C.) for about 24 hours, while stirring at ~250 rpm. Then, the aged mixture was reacted at ~158° F. (~70° C.) in a ~2-liter autoclave, while stirring at ~250 rpm, for ~192 more hours. The product was filtered, washed with deionized (DI) water, and dried at ~250° F. (~120° C.). The X-ray diffraction (XRD) pattern of the as-synthesized product material showed the typical phase of zeolite Y crystal topology. The SEM image of the as-synthesized product material showed that the material was composed of aggregates (~1 micron) of small crystals, as shown in FIG. 3. The as-synthesized Meso-Y crystals had a $SiO_2/Al_2O_3$ molar ratio of ~5.6 and a unit cell size (UCS) of approximately 24.65 Angstroms. One portion of the as-synthesized crystals was ion-exchanged with ~1N ammonium nitrate solution (in water) at room temperature to reduce sodium levels down to ~2% and was then calcined various temperatures (~600° C. and ~800° C.) in air for about 24 hours to stabilize their structures. Other portions of the as-synthesized crystals were ion-exchanged with ~1N ammonium nitrate solution (in water) at room temperature to reduce sodium levels down to ~2% and were then steamed twice (i.e., 2×) at various temperatures (~600° C. and ~700° C.). To be clear, these other portions were ion-exchanged at room temperature, then steamed at a given temperature, then ion-exchanged at room temperature again, and then steamed at the given temperature again. Pore size distributions based on desorption isotherms from $N_2$ BET analysis of certain Table 1 samples are graphically depicted in FIG. 5 for comparison. Properties of those resulting products are shown in Table 1 below.

TABLE 1

Properties of stabilized Meso-Y from Example 3

| Series # (FIG. 7) | Calcination/Steaming Temperature | Surface Area [m²/g] (micro + external SA) | Alpha Value |
|---|---|---|---|
| 1 | Calc. ~600° C. w/o Steaming | ~840/(~814 + ~25) | ~26 |
| — | Calc. ~800° C. w/o Steaming | ~835/(~794 + ~41) | ~5.4 |
| 2 | Steam 2× ~600° C./ Ion-exchange | ~667/(~604 + ~64) | ~100 |
| 3 | Steam 2× ~700° C./ Ion-exchange | ~678/(~612 + ~67) | ~15 |

Figure 5:
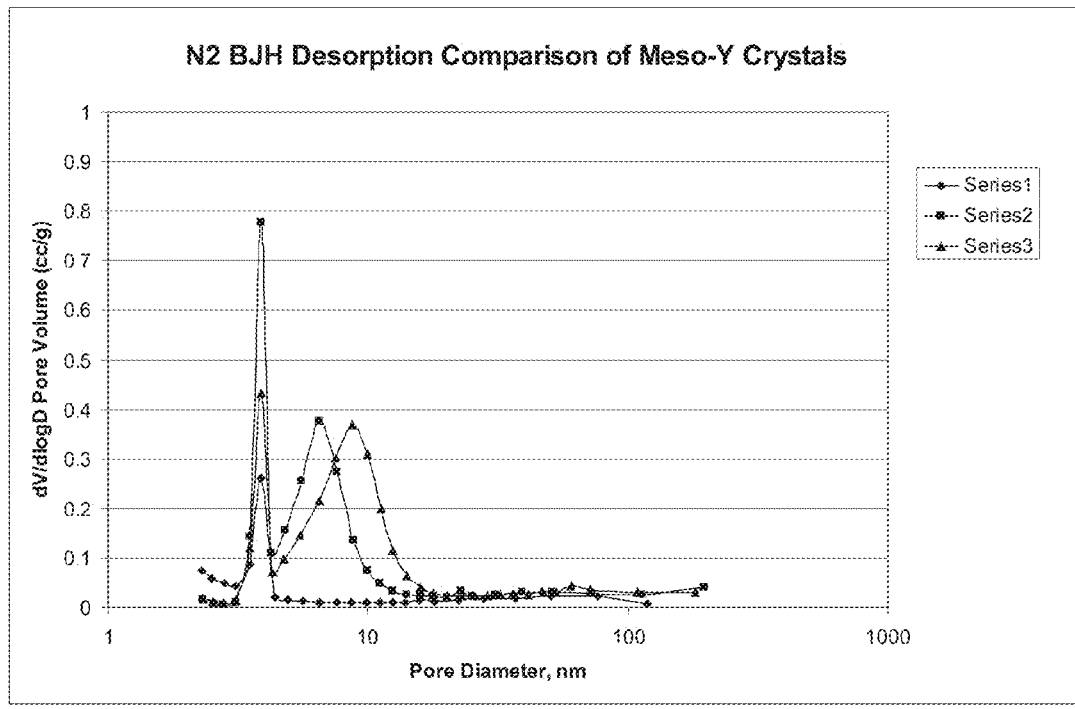
FIG. 5 shows a plot of pore size distributions based on BJH Desorption from $N_2$ BET analysis of samples: calcined at ~600° C., steamed treated at ~600° C., and steam treated at ~700° C., as prepared according to Example 4.

As clearly shown in FIG. 5, all three samples show a major peak at ~40 Angstroms, which (without being bound by theory) is believed to be associated with inter-crystal (or inter-primary particle) mesoporosity on steam-stabilized highly-aggregated Meso-Y products. For Series #1, this peak indicates the presence of high existing mesoporosity on calcined Meso-Y crystals even without a steam treatment. Typical stabilized zeolite Y (USY) products, however, tend to exhibit a very low ~40 Angstroms (inter-crystal) pore volume, which can classically be generated/increased either by relatively high temperature calcination or steaming treatments (intra-crystal mesoporosity may additionally be generated/increased by such treatments). In this Example, a relatively high intensity of existing mesoporosity on Meso-Y crystals prior to steam treatment was observed after calcination at ~600° C. or above. For steamed products, an increase of inter-crystal (alternately termed "primary particle") mesopore volume and a creation of an additional larger intra-crystal mean mesopore of at least 80 Angstroms were observed after both milder and high temperature steam treatments.

Example 4

Preparation of Aggregated NaY (Meso-Y) Crystals

A mixture was prepared from ~830 grams of water, ~258 grams of Ultrasil® silica, ~96 grams of sodium aluminate solution (45% in water), and ~180 grams of 50% sodium hydroxide solution (in water). The mixture had the following molar composition:

| | |
|---|---|
| $SiO_2/Al_2O_3$ | ~16.2 |
| $H_2O/SiO_2$ | ~14.2 |
| $OH^-/SiO_2$ | ~0.72 |
| $Na^+/SiO_2$ | ~0.72 |

Figure 4:
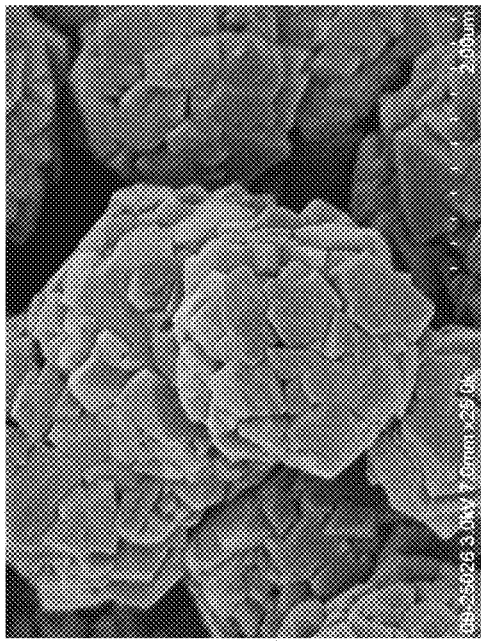
FIG. 4 shows a scanning electron microscope (SEM) image of a highly aggregated NaY sample prepared according to Example 4.

The mixture was first aged at room temperature (about 20-25° C.) for about 24 hours, while stirring at ~250 rpm. Then, the aged mixture was reacted at ~200° F. (~93° C.) in a ~2-liter autoclave under static conditions for ~120 more hours. The product was filtered, washed with deionized (DI) water, and dried at ~250° F. (~120° C.). The X-ray diffraction (XRD) pattern of the as-synthesized product material showed the typical phase of zeolite Y crystal topology. The SEM image of the as-synthesized product material showed that the material was composed of aggregates of small crystals with an aggregate (i.e., secondary) particle size of ~2 microns, as shown in FIG. 4, which is larger than the secondary particle size of the product of Example 3. The as-synthesized Y crystals had a $SiO_2/Al_2O_3$ molar ratio of ~5.5. FIG. 5 shows nitrogen adsorption-desorption isotherms and pore size distributions from BJH desorption of $N_2$ BET analysis of a sample of the product after calcination at about 600° C. These plots indicate the presence of existing mesoporosity in the highly aggregated calcined product before any steam treatment step.

Example 5

Preparation of Aggregated NaY (Meso-Y) Crystals
(~10× Scale-up of Example 4)

A mixture was prepared from ~8.3 kilograms of water, ~2.58 kilograms of Ultrasil® silica, ~960 grams of sodium aluminate solution (45% in water), and ~1.8 kilograms of 50% sodium hydroxide solution (in water). The mixture had the following molar composition:

| | |
|---|---|
| $SiO_2/Al_2O_3$ | ~16.2 |
| $H_2O/SiO_2$ | ~14.2 |
| $OH^-/SiO_2$ | ~0.72 |
| $Na^+/SiO_2$ | ~0.72 |

Figure 6:
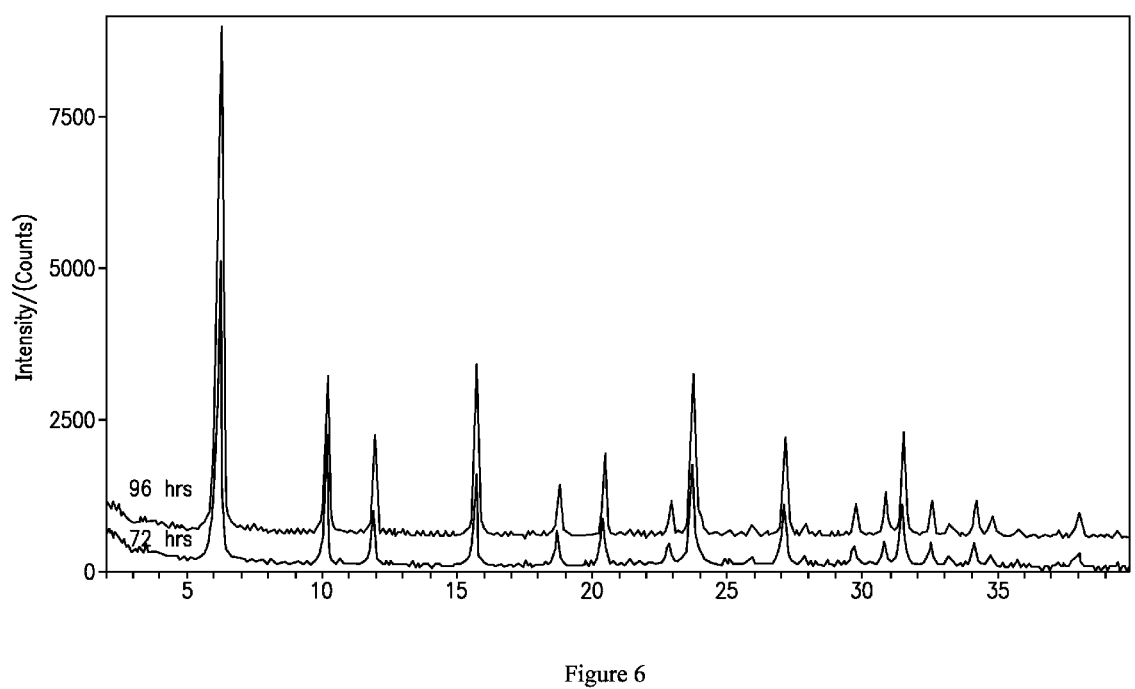
FIG. 6 shows XRD patterns of samples prepared according to Example 5.

The mixture was first aged at room temperature (about 20-25° C.) for about 24 hours, while stirring at ~250 rpm. Then, the aged mixture was reacted at ~200° F. (~93° C.) in a ~5-gallon autoclave under static conditions for ~96 more hours. The product was filtered, washed with deionized (DI) water, and dried at ~250° F. (~120° C.). The X-ray diffraction (XRD) patterns, as shown in FIG. 6, of as-synthesized product samples taken at ~72 hours and at ~96 hours showed the typical pure phase of zeolite Y crystal topology. Reaction appeared to be complete at less than ~96 hours. The resulting as-synthesized product crystals had a $SiO_2/Al_2O_3$ molar ratio of ~5.5.

Example 6

Stabilization by Mild Steaming Conditions on Meso-Y/Alumina Catalysts

About 65 parts of Meso-Y crystal prepared according to Example 5 having a silica/alumina molar ratio of ~5.5 were mixed with about 35 parts of Versal™ 300 pseudoboehmite alumina binder (basis: calcined at ~538° C.) in a Simpson™ muller. Sufficient water was added to produce an extrudable paste on a ~2" (~5.1 cm) diameter Bonnot™ extruder. The mixture of Meso-Y, pseudoboehmite alumina, and water was extruded into ~1/16" diameter quadrulobes, and then dried in a hotpack oven at ~121° C. overnight (for about 10-18 hours). The dried extrudate was calcined in nitrogen at ~538° C. and was then humidified with water-saturated air (~100% RH) and ion-exchanged with ~1N ammonium nitrate solution (in water) to remove sodium. After ammonium nitrate exchange, the extrudate was washed with deionized water to remove residual nitrate ions, prior to drying at ~121° C. overnight again and subsequent calcination in air at ~538° C. The resulting extrudates were then steamed at ~700° C. for about 4 hours, followed by additional ion-exchange to obtain the final extrudate for Pt impregnation. The final extrudate was then impregnated via incipient wetness to ~0.6 wt % Pt using tetraammineplatinumnitrate, followed by calcination in air for about 3 hours at ~680° F. (~405° C.).

Examples 7A-B

Figure 7:
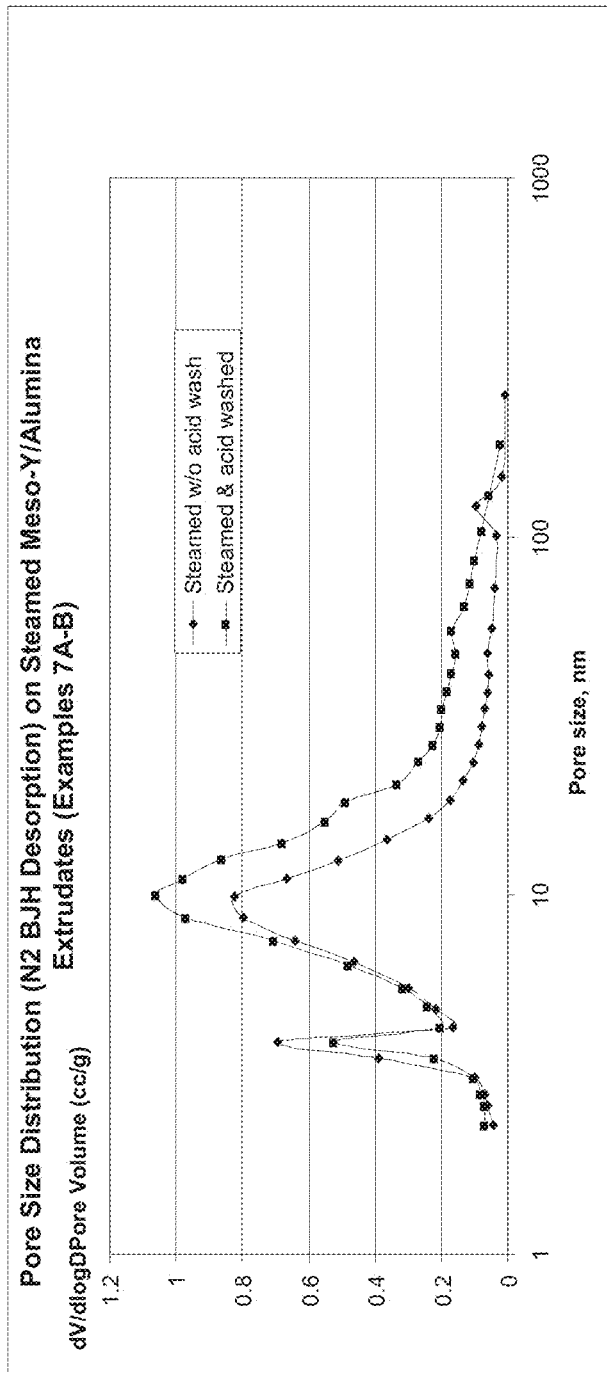
FIG. 7 depicts a plot of pore size distributions based on BJH Desorption from $N_2$ BET analysis of samples prepared according to Examples 7A-B.

Stabilization of Meso-Y/Alumina Catalysts by High Temperature (>700° C.) Steam Treatment About 65 parts of Meso-Y crystal prepared according to Example 5 having a silica/alumina molar ratio of ~5.5 were mixed with about 35 parts of Versal™ 300 pseudoboehmite alumina binder (basis: calcined at ~538° C.) in a Simpson™ muller. Sufficient water was added to produce an extrudable paste on a ~2" (~5.1 cm) diameter Bonnot™ extruder. The mixture of Meso-Y, pseudoboehmite alumina, and water was extruded into ~1/16" diameter quadrulobes, and then dried in a hotpack oven at ~121° C. overnight (for about 10-18 hours). The dried extrudate was calcined in nitrogen at ~538° C. and was then humidified with water-saturated air (~100% RH) and ion-exchanged with ~1N ammonium nitrate solution (in water) to lower sodium content. After ammonium nitrate exchange, the extrudate was washed with deionized water to remove residual nitrate ions, prior to drying at ~121° C. overnight again and subsequent calcination in air at ~538° C. The resulting extrudates were then steamed at ~760° C. for about 1 hour, followed by additional ion-exchange to obtain a treated extrudate. Properties of the treated extrudate included an Alpha Value of ~140, a UCS of 24.52 Angstroms, and a total surface area of ~484 $m^2/g$ (with a micropore surface area of ~307 $m^2/g$ and an external surface area of ~177 $m^2/g$). The resulting treated extrudate was then steamed again at ~760° C. for about 16 hours, and a portion was washed with oxalic acid to remove non-framework alumina. The portion that was washed with oxalic acid is referred to herein as Meso-Y-B extrudate, and the other portion that was not washed is referred to herein as Meso-Y-A extrudate. The pore size distributions of these two extrudates are shown in FIG. 7. These extrudates were then each impregnated via incipient wetness to ~0.6 wt % Pt using tetraammineplatinumnitrate, followed by calcination in air for about 3 hours at ~680° F. (~405° C.).

Comparing. FIGS. 5 and 7, more mesopore volume was found on steam treated extrudates bound with alumina. Also, more mesopore volume and broader pore size distribution appeared on the acid washed sample, which is consistent with BET surface area data (more external surface area). Also, higher Alpha value was found on the acid washed sample after removing non-framework Al atoms (or other species), as can be seen in Table 2 below.

TABLE 2

Properties of Meso-Y/alumina catalysts stabilized by high temperature steam treatment

| Catalyst | Surface Area [m$^2$/g] (micro + external SA) | Alpha Value | SiO$_2$/Al$_2$O$_3$/Na (wt ratio) |
|---|---|---|---|
| HT Stabilized Meso-Y-A[1] | 463/(295 + 167) | 2.4 | 40.7/34.8/0.52 |
| HT Stabilized Meso-Y-B[2] | 410/(201 + 209) | 9.4 | 52.5/42.4/0.17 |

[1]Steamed at ~760° C. for ~16 hours (without acid wash)
[2]Steamed at ~760° C. for ~16 hours (with oxalic acid wash)

Examples 8A-B

Hydrocracking of Vacuum Gas Oils (VGO) with the High Temperature-stabilized Meso-Y/Alumina Catalysts of Examples 7A-B In this Example, the HT Stabilized Meso-Y Sample A (labeled as "MesoY-A") and the HT Stabilized Meso-Y Sample B (labeled as "MesoY-B") hydrocracking catalyst embodiments of the invention from Example 7A-B were comparatively tested under simulated hydrocracking conditions with four (4) comparative hydrocracking catalysts made with commercial USY zeolites.

For the four comparative hydrocracking catalysts about 65 parts of Zeolyst®'s CBV-720®, CBV-760®, CBV-780® or Tosoh®'s HSZ-385® USY crystal having a silica/alumina molar ratio of ~30, 60, 80 or 110, respectively, were mixed with about 35 parts of Versal™ 300 pseudoboehmite alumina binder (basis: calcined at ~538° C.) in a Simpson™ muller. Tetraethylammonium Hydroxide (TEAOH) was added to a sufficient quantity of water to produce a 2% solution, and was added to produce an extrudable paste on a ~2" (~5.1 cm) diameter Bonnot™ extruder. The mixture of USY crystal, pseudoboehmite alumina, and TEAOH/water was extruded into ~1/16" diameter quadrulobes, and then dried in a hotpack oven at ~121° C. overnight (for about 10-18 hours). The dried extrudate was calcined in 100% air at 525° C. for six hours. Once complete, the extrudate was then impregnated via incipient wetness to ~0.6 wt % Pt using tetraammineplatinumnitrate, dried in a hotpack oven at ~121° C. overnight (for about 3 hours), followed by calcination in air for about 3 hours at ~680° F. (~405° C.).

As such, the two (2) catalysts of invention (designated as "MesoY-A" and "MesoY-B") and the four (4) USY reference catalysts (designated as "USY-1", "USY-2", "USY-3" and "USY-4") had similar binder compositions and content, zeolite content, and platinum metal loadings. The properties of the six (6) catalysts utilized in this example are shown in Table 3.

TABLE 3

Properties of catalysts tested in Examples 8A-B

| Test | Units | USY-1 HSZ-385 | USY-2 CBV-720 | USY-3 CBV-760 | USY-4 CBV-780 | MesoY-A | MesoY-B |
|---|---|---|---|---|---|---|---|
| Alpha | — | 21 | 100 | 36 | 23 | 2.4 | 9.4 |
| Average Pore Diameter (Desorp) | nm | 6.5989 | 6.7472 | 6.8601 | 6.1595 | 7.9033 | 9.5357 |
| Pore Volume | cc/gm | 0.621408 | 0.615034 | 0.642638 | 0.587265 | 0.523096 | 0.674233 |
| BET-Total | m$^2$/gm | 655.805 | 686.3543 | 657.5367 | 670.0247 | 462.6922 | 410.3157 |
| Micropore Surface Area (ZSA) | m$^2$/gm | 446.7341 | 492.4396 | 370.1106 | 400.5371 | 295.3123 | 201.2476 |
| External Surface Area (MSA) | m$^2$/gm | 209.0709 | 193.9147 | 287.4261 | 269.4876 | 167.3799 | 209.0681 |
| Micropore Volume | cc/gm | 0.183178 | 0.205591 | 0.159164 | 0.172961 | 0.121414 | 0.086392 |
| External SA/Total SA | — | 0.32 | 0.28 | 0.44 | 0.40 | 0.36 | 0.51 |

As can be seen in Table 3, the catalysts of invention have a combination low Alpha values, low BET Total Surface Areas, and high External Surface Area: Total Surface Area ratios (i.e., "Relative External Surface Area" as defined in equation [1] herein). The catalysts of invention (as shown in embodiments MesoY-A and MesoY-B) also have a significantly higher average pore diameter than the comparable reference catalysts. It is believed that these aspects function to improve the diesel selectivity of the catalyst. As can be seen in the data in Table 3 above, the embodiments of the catalysts of invention (MesoY-A and MesoY-B) have very low total surface areas compared to the catalysts of the prior art while maintaining external surface areas near those of the prior art. In preferred embodiments of the hydrocracking catalysts of invention herein, the catalyst has a Relative External Surface Area of at least 0.35, more preferably at least 0.50. As can further be seen in Table 3, the catalysts of invention have significantly higher average pore diameters than the conventional USY catalysts. In preferred embodiments of the catalysts of invention herein, the average pore diameter of the catalyst (as measured by nitrogen desorption) is at least 7.0 nanometers (nm), preferably at least 7.5 nm, more preferably at least 8.0 nm, and most preferably at least 9.0 nm. These catalyst aspects contribute to high diesel selectivity in the catalysts of invention as will be shown in this example.

All the catalysts were tested under hydrocracking conditions in a batch micro-reactor configuration. Initially, each of the selected reactor vials was charged with the respective catalyst (sized to 90-300 μm and always a fixed amount of 65 μl). The unit is then sealed and placed on the shaker assembly, pressure tested followed by a reduction under a hydrogen atmosphere. The assembly was transferred into a glove box and opened to dispense the hydrocarbon feed (see feed properties in Table 4) into the individual wells. The catalysts were then exposed to hydrocracking conditions by heating to assembly 330° C. (626° F.) at a pressure of 715 psi with 100% $H_2$ and a shaking speed of 500 rpm. The reaction was progressed for a total duration of 24 hrs, following which the reactor is cooled to ambient conditions and de-pressurized. The product liquid is robotically sampled (inside the glove box), diluted, and then analyzed for simulated distillation.

The hydrocarbon feed utilized in the testing of this example was a typical hydrotreated and fractionated vacuum gas oil (VGO) feedstock. Table 4 shows the composition of the hydrocarbon feed utilized during the testing. The hydrocarbon feed that was utilized boiled above the 400 to 700° F. diesel range, and simulated a typical gas oil range feedstock. As such, all diesel range material present in the products was a resulting conversion product from higher boiling point hydrocarbons obtained under hydrocracking conditions.

TABLE 4

Properties of hydrocarbon feedstock utilized in hydrocracking testing in Examples 8A-B

| Result Descripton | Result | Units |
|---|---|---|
| Sulfur | 178 | ppm |
| Nitrogen | <10 | ppm |
| Density @ 70° C. | 0.8412 | g/cm³ |
| 0.5% SimDist | 721.58 | ° F. |
| 5% SimDist | 752.18 | ° F. |
| 10% SimDist | 765.5 | ° F. |
| 20% SimDist | 784.22 | ° F. |
| 30% SimDist | 800.6 | ° F. |
| 40% SimDist | 817.16 | ° F. |
| 50% SimDist | 834.8 | ° F. |
| 60% SimDist | 852.8 | ° F. |
| 70% SimDist | 872.06 | ° F. |
| 80% SimDist | 895.1 | ° F. |
| 90% SimDist | 927.5 | ° F. |
| 95% SimDist | 950.54 | ° F. |
| 99.5% SimDist | 1009.4 | ° F. |

Figure 8:
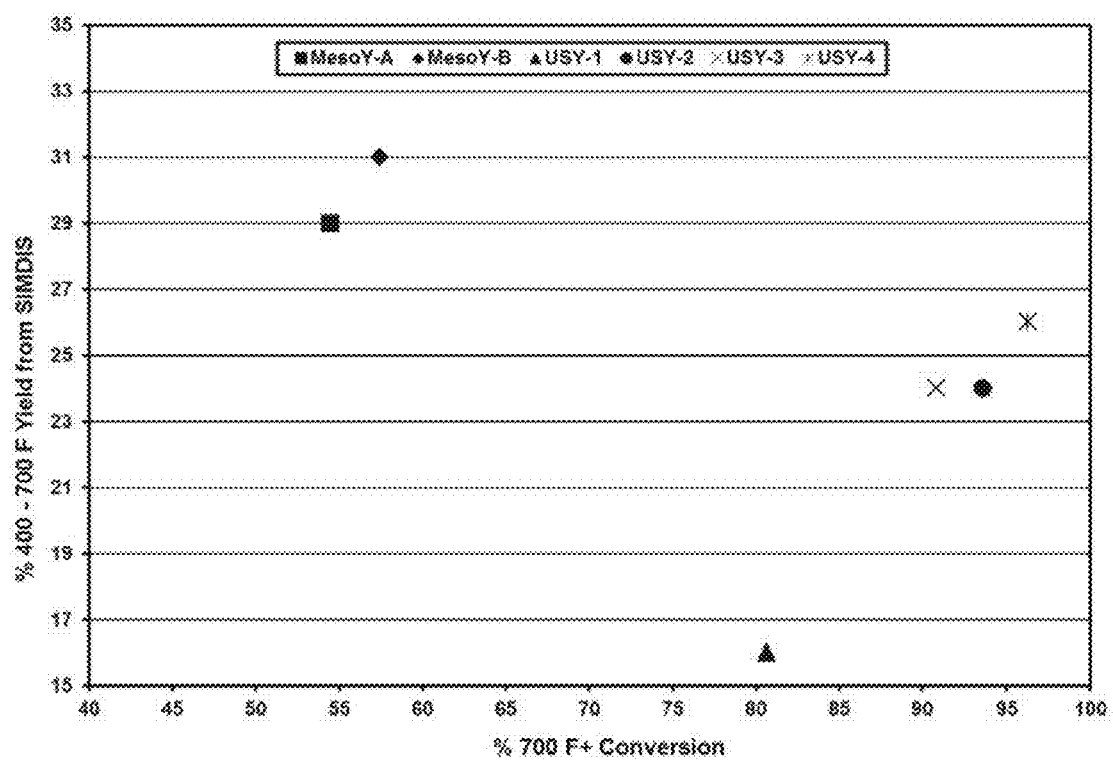
FIG. 8 depicts a plot showing hydrocracking diesel product yields comparing two (2) embodiments of hydrocracking catalysts containing the aggregated Y zeolites of the present invention as compared to four (4) comparative hydrocracking catalysts containing USY zeolites of the prior art per Example 8A-B.

The distillate yields (by wt % of product) and % 700° F.+ conversions (i.e., amount of feed that was converted to products boiling below 700° F.) from the testing in this example for each of the catalysts are shown graphically in FIG. 8. As can be seen, the MesoY-A and MesoY-B catalysts of invention produced a higher diesel yield than the reference USY hydrocracking catalysts (diesel yields of about 29-31% vs. about 16-26%). What is even more significant, is that under the same test conditions, the MesoY-A and MesoY-B catalysts of invention produced a higher diesel yield than the reference USY hydrocracking catalysts even at lower overall conversions (at 700° F.+ conversions of about 53-57% vs. about 81 to 96%). This means that the selectivity of the catalysts of invention for diesel production were significantly higher than the reference hydrocracking catalysts utilizing USY zeolites of the prior art.

The selectivity to diesel can be calculated by the following equation:

$$\text{Selectivity to Diesel} = \frac{\% \text{ Diesel in Product}}{\% \text{ Conversion of } 700° \text{ F.+Feedstock}} \quad [2]$$

Figure 9:
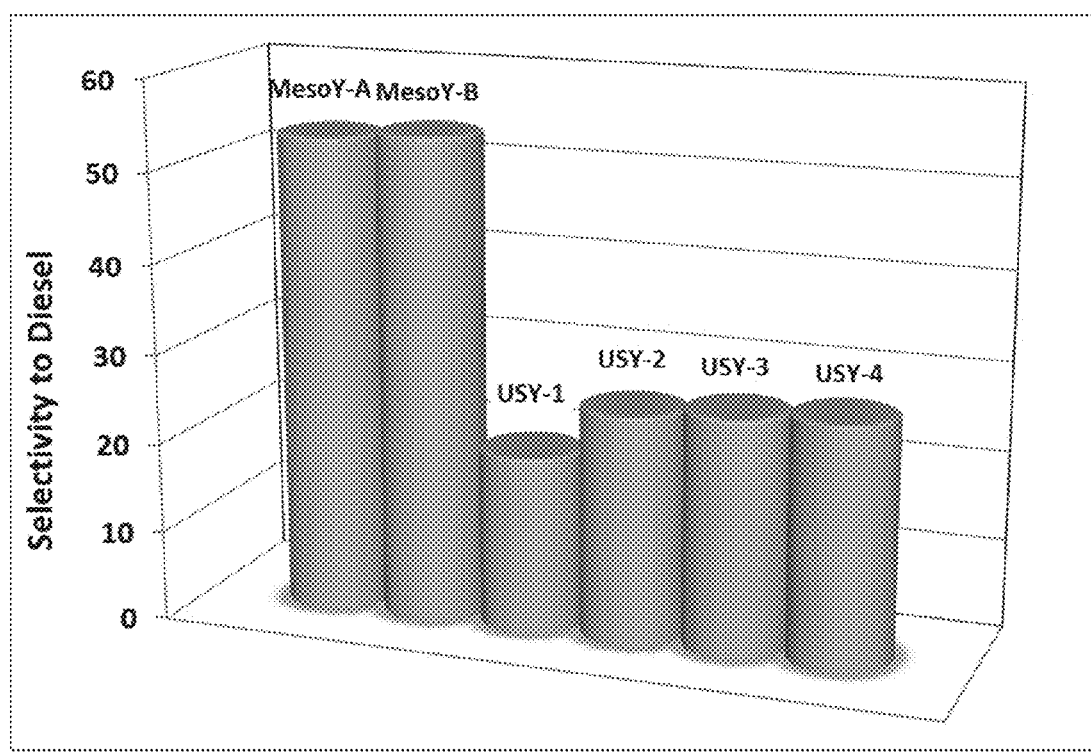
FIG. 9 depicts a plot showing the selectivity of the diesel product yields of two (2) embodiments of hydrocracking catalysts containing the aggregated Y zeolites of the present invention as compared to four (4) comparative hydrocracking catalysts containing USY zeolites of the prior art per Example 8A-B.

FIG. 9 shows the results of the testing in terms of diesel selectivity. As can be seen FIG. 9, the hydrocracking catalysts embodiments of invention were about 100% more selective (i.e., about twice as selective) toward diesel production as the reference catalysts. As such, even if the hydrocracking process were operated at conditions to produce higher overall conversion, the catalysts of invention would still be expected to be about twice as selective to diesel production than the reference catalysts simulating comparative USY hydrocracking catalysts of the prior art.

What is claimed is:

1. A hydrocracking catalyst for improved diesel production, wherein the catalyst comprises:
   a) an aggregated form of zeolite Y comprising small size primary crystallites of zeolite Y, wherein at least a portion of the primary crystallites are aggregated to form larger secondary particles, wherein the aggregated zeolite Y has a silica-to-alumina ratio of at least 4:1, and an alkali metal content of less than 4 wt % based on the zeolite; and
   b) a binder;
   wherein the hydrocracking catalyst has an Alpha value of less than 15, and an External Surface Area-to-Total Surface Area ratio of at least 0.35:1.

2. The hydrocracking catalyst of claim 1, wherein the aggregated zeolite Y has been stabilized by steaming at a temperature of at least 700° C.

3. The hydrocracking catalyst of claim 2, wherein the average pore diameter of the catalyst is at least 7.0 nm.

4. The hydrocracking catalyst of claim 3, wherein the steam-stabilized aggregated zeolite Y has been further acid washed.

5. The hydrocracking catalyst of claim 3, wherein the aggregated zeolite Y has been calcined prior to steaming.

6. The hydrocracking catalyst of claim 3, wherein the binder comprises a material selected from metal oxides, zeolites, aluminum phosphates, polymers, carbons, and clays.

7. The hydrocracking catalyst of claim 6, wherein the binder is comprised of at least one metal oxide, preferably selected from silica, alumina, silica-alumina, amorphous aluminosilicates, boron, titania, and zirconia.

8. The hydrocracking catalyst of claim 7, wherein the average pore diameter of the catalyst is at least 8.0 nm.

9. The hydrocracking catalyst of claim 8, wherein the binder content is from 5 to 90 wt % based on the total weight of the catalyst.

10. The hydrocracking catalyst of claim 1, wherein the total BET surface area is less than 500 m²/g.

11. The hydrocracking catalyst of claim 1, further comprising at least one Group VIIIA metal selected from Pt and Pd.

12. The hydrocracking catalyst of claim 1, further comprising at least one Group VIIIA metal selected from Ni and Co.

13. The hydrocracking catalyst of claim 12, further comprising at least one Group VIA metal selected from Mo and W.

14. The hydrocracking catalyst of claim 13, wherein the combined amount of Group VIA and Group VIIIA metals is from 0.25 wt % to 40 wt % based on the total weight of the catalyst.

15. The hydrocracking catalyst of claim 3, wherein the hydrocracking catalyst has an Alpha value of less than 10.

16. The hydrocracking catalyst of claim 15, wherein External Surface Area-to-Total Surface Area ratio of at least 0.50:1.

17. The hydrocracking catalyst of claim 16, wherein the total BET surface area is less than 450 m²/g.

18. The hydrocracking catalyst of claim 1, wherein in the aggregated zeolite Y, at least 80% of the primary crystallites are aggregated to form the secondary particles.

19. The hydrocracking catalyst of claim 18, wherein the aggregated zeolite Y has a unit cell size of about 25 Angstroms or less.

20. The hydrocracking catalyst of claim 18, wherein an average size of the secondary particles, as viewed from the external surface of the secondary particles, is about 0.8 micron or more, and wherein at least one of the following conditions apply:
  (a) an average size of the primary crystallites in the secondary particles, as viewed from the external surface of the secondary particles, is about 0.5 micron or less;
  (b) at least 80% of the secondary particles comprise at least 5 primary crystallites; and
  (c) in at least 80% of the secondary particles, a ratio of the average size of the secondary particles to the average size of the primary crystallites is at least 3:1.

21. The hydrocracking catalyst of claim 20, wherein secondary particles have an external surface area of about 20 m²/g or more.

22. The hydrocracking catalyst of claim 18, further comprises at least one molecular sieve selected from beta, ZSM-5, ZSM-11, ZSM-57, MCM-22, MCM-49, MCM-56, ITQ-7, ITQ-27, ZSM-48, mordenite, zeolite L, ferrierite, ZSM-23, MCM-68, SSZ-26/-33, CIT-1, SAPO-37, ZSM-12, ZSM-18, and EMT faujasites.

23. A process for converting a hydrocarbon feedstock into diesel products, such process comprising:
  a) contacting the hydrocarbon feedstock with a hydrocracking catalyst in the presence of hydrogen under hydrocracking conditions to produce a hydrocracked effluent;
  b) removing at least a portion of the gaseous products in the hydrocracked effluent to produce a liquid hydrocracked effluent fraction; and
  c) separating a diesel range boiling point product from the liquid hydrocracked effluent fraction;
  wherein the hydrocracking catalyst comprises:
    an aggregated form of zeolite Y comprising small size primary crystallites of zeolite Y, wherein at least a portion of the primary crystallites are aggregated to form larger secondary particles, wherein the aggregated zeolite Y has a silica-to-alumina ratio of at least 4:1, and an alkali metal content of less than 4 wt % based on the zeolite; and
    a binder;
  wherein the hydrocracking catalyst has an Alpha value of less than 15, and an External Surface Area-to-Total Surface Area ratio of at least 0.35:1.

24. The process of claim 23, wherein the hydrocracking conditions include a reaction temperature from about 550° F. (288° C.) to about 800° F. (427° C.), a total pressure from about 300 psig (2.1 MPag) to about 3000 psig (20.7 MPag), an LHSV from about 0.1 hr$^{-1}$ to about 20 hr$^{-1}$, and a hydrogen treat gas rate from about 500 scf/bbl (85 Nm³/m³) to about 10000 scf/bbl (1700 Nm³/m³).

25. The process of claim 24, wherein hydrocarbon feedstock is comprised of a gasoil having an initial boiling point above about 400° F. (204° C.), a T50 boiling point of at least about 500° F. (260° C.) and an end boiling point of at least about 600° F. (315° C.).

26. The process of claim 25, wherein the hydrocarbon feedstock contains at least 25 wt % hydrocarbons with boiling points above 700° F. (371° C.).

27. The process of claim 26, wherein the portion of the hydrocarbon feedstock boiling above 700° F. (371° C.) has a T50 boiling point above 800° F. (427° C.).

28. The process of claim 26, wherein the aggregated zeolite Y has been stabilized by steaming at a temperature of at least 700° C.

29. The process of claim 28, wherein the average pore diameter of the catalyst is at least 7.0 nm.

30. The process of claim 29, wherein the steam-stabilized aggregated zeolite Y has been further acid washed.

31. The process of claim 29, wherein the aggregated zeolite Y has been calcined prior to steaming.

32. The process of claim 31, wherein the catalyst binder is comprised of at least one metal oxide, preferably selected from silica, alumina, silica-alumina, amorphous aluminosilicates, boron, titania, and zirconia.

33. The process of claim 32, wherein the average pore diameter of the catalyst is at least 8.0 nm.

34. The process of claim 33, wherein the catalyst binder content is from 5 to 90 wt % based on the total weight of the catalyst.

35. The process of claim 34, wherein the total BET surface area of the hydrocracking catalyst is less than 500 m²/g.

36. The process of claim 34, wherein the hydrocracking catalyst further comprises at least one Group VIIIA metal selected from Pt and Pd.

37. The process of claim 34, wherein the hydrocracking catalyst further comprises at least one Group VIIIA metal selected from Ni and Co.

38. The process of claim 37, wherein the hydrocracking catalyst further comprises at least one Group VIA metal selected from Mo and W.

39. The process of claim 38, wherein the combined amount of Group VIA and Group VIIIA metals is from 0.25 wt % to 40 wt % based on the total weight of the hydrocracking catalyst.

40. The process of claim 35, wherein the hydrocracking catalyst has an Alpha value of less than 10.

41. The process of claim 40, wherein the hydrocracking catalyst has an External Surface Area-to-Total Surface Area ratio of at least 0.50:1 and a total BET surface area of less than 450 m²/g.

42. The process of claim 41, wherein in the aggregated zeolite Y, at least 80% of the primary crystallites are aggregated to form the secondary particles and the average size of the secondary particles, as viewed from the external surface of the secondary particles, is about 0.8 micron or more, and wherein at least one of the following conditions apply:
  (a) an average size of the primary crystallites in the secondary particles, as viewed from the external surface of the secondary particles, is about 0.5 micron or less;
  (b) at least 80% of the secondary particles comprise at least 5 primary crystallites; and
  (c) in at least 80% of the secondary particles, a ratio of the average size of the secondary particles to the average size of the primary crystallites is at least 3:1.

43. The process of claim 42, wherein the secondary particles have an external surface area of about 20 m²/g or more.

44. The process of claim 43, wherein the aggregated zeolite Y has a unit cell size of about 25 Angstroms or less.

* * * * *